United States Patent [19]

Broding

[11] 4,017,833
[45] Apr. 12, 1977

[54] SUMMER FOR GROUP RECORDER

[75] Inventor: Robert A. Broding, Tulsa, Okla.

[73] Assignee: Standard Oil Company (Indiana), Chicago, Ill.

[22] Filed: Dec. 29, 1975

[21] Appl. No.: 644,795

[52] U.S. Cl. ............... 340/15.5 TS; 340/15.5 DP; 346/33 C; 325/6
[51] Int. Cl.² ....................................... G01V 1/22
[58] Field of Search ............ 340/15.5 TS, 15.5 DP, 340/16 C, 147 B, 147 CN; 325/6, 28, 113; 346/33 C

[56] References Cited

UNITED STATES PATENTS

| | | | |
|---|---|---|---|
| 3,134,957 | 5/1964 | Foote et al. ................. | 340/15.5 TS |
| 3,806,864 | 4/1974 | Broding et al. ............... | 346/33 C |
| 3,881,166 | 4/1975 | Fort et al. .................... | 340/15.5 TS |
| 3,883,725 | 5/1975 | Fort et al. .................... | 340/15.5 DP |
| 3,946,357 | 3/1976 | Weinstein et al. ............ | 340/15.5 TS |

OTHER PUBLICATIONS

RCA Solid State, Data Book Series, COS/MOS Digital Integrated Circuits, 1973, pp. 2–6.

Primary Examiner—Nelson Moskowitz
Attorney, Agent, or Firm—Albert C. Metrailer; Arthur McIlroy

[57] ABSTRACT

Cableless seismic recorders employ a small, mobile amplifier-recorder in which preferentially the recorder tape contains in digital form both identification information (called header data) and the response of a plurality of seismometers (seismometer group) to a seismic source, the whole arrangement requiring no cable connection between the various recorders and the control truck. Since this system is energized by a battery, it has not been previously possible to use summation techniques, as required, for example, when any repetitive seismic source is employed. Such a system is described here. Low power consumption is obtained by using a plurality of recirculating, dynamic shift registers connected in cascade. Feedback from the output of this cascade register chain under synchronized condition permits the seismometer response to the second use of the source to be additively superimposed upon the stored data from the first use of the source, and so on. Ultimately, the control truck sends commands terminating the cumulative recording and causing the summed signals, in turn, to be reproducibly recorded.

4 Claims, 3 Drawing Figures

SUMMER FOR GROUP RECORDER

ASSOCIATED PATENTS AND PATENT APPLICATIONS

This system forms a modification of U.S. Pat. No. 3,806,864, of which I am co-inventor. Reference is additionally made to the following U.S. patent applications: Ser. Nos. 529,308; 572,493; and 608,137.

FIELD OF THE INVENTION

This invention has particular importance in the field of seismic geophysical surveying using cableless, seismic digital recorders. It will be particularly described in connection with operations of the Vibroseis system. (Vibroseis is a registered trademark of the Continental Oil Company, Ponca City, Okla., U.S.A.) In this system, a frequency-modulated seismic signal is applied to the ground through truck-mounted shaking machines. Since the peak output of such devices is considerably limited, it has been found desirable when using conventional recording systems in the past to record the response from each seismometer group on a temporary storage system, for example, on an endless belt magnetic tape, and repeat the procedure for a plurality of excitations of the ground (called "sweeps") in such a manner that the response of the seisometer group is added to the corresponding response of the same group for the previous sweeps employed.

This type of operation is desirable using the cableless, seismic digital recording system, but requires too much battery power when ordinary means of repetitively storing and summing the signals is employed. This is overcome in the system described below.

DESCRIPTION OF THE PRIOR ART

While this system provides for data acquisition generally, and is therefore pertinent to this field and the associated fields of vibration analysis, radar and sonar signaling, etc., it is considered most appropriate in the field of seismic prospecting. Reference was made above to U.S. Pat. No. 3,806,864, of which the present application is an improvement. Reference was also made to one of the several systems of seismic prospecting using a repetition of the seismic source to sum data preliminary to its analysis, i.e., Crawford and Doty U.S. Pat. No. 2,688,124, which was the parent disclosure of the Vibroseis system. The use of repetitive drops of a weight, or other systems of this sort, will also be found to be entirely compatible with this invention.

In the last few years, some development has made of a different system of data acquisition, using what has been colloquially referred to as "sign bit recording." The only reference I have seen on this is in the recently issued U.S. Pats. Nos. 3,881,166 and 3,883,725. Reference is made in these patents to pending U.S. applications, Ser. Nos. 358,076, and 358,077, which presumably carry further information and details on the system. This sign-bit recording system introduces a simplification in data acquisition processes which I have employed approximately to double the capacity of the memory system used in this invention. The use of that kind of a system is not essential, however, as will be explained subsequently.

SUMMARY OF THE INVENTION

A plurality of small, portable magnetic recorder units are employed in geophysical prospecting, or the like, each placed near and connected to one or two seismometer groups for recording one or two traces of a multiple trace record. The data to be recorded for a single use of a seismic source are broken into bits, using an accurate, predetermined bit-sampling rate. As these data are produced, they are temporarily stored in a recirculating, dynamic shift register, which ordinarily will be composed of a plurality of such units connected in cascade. Thus, as the data acquisition proceeds, the memory cells in the shift register are serially filled until the entire record has been obtained. The storing procedure continues until a predetermined number of input bits of data has been impressed in the register that are exactly equal to the maximum possible number of bits in any one serial chain in the registers. The system automatically stops at this point unless the master control unit signal calls to continue to sum, in which case, the initial data are recycled to an addition unit, where on a synchronous basis each of these is combined with new data for the seismometer group, and the modified or added data restored in the same order in the cells of the shift register. Accordingly, as many sweeps or repetitions of the seismic source as desired are added up in this fashion in the registers. Ultimately, the operator signals (ordinarily through radio or a similar communications link) to all activated group recorders to record the data, at which time, the contents of the registers are serially dumped onto a relatively low-powered magnetic tape recorder. However, the power required from the battery during each successive addition on the registers is much lower than that required to activate the tape recorder and, accordingly, a large number of summed records can be produced in the course of a day's operation.

Data quality control is maintained in that if the data presented for summing the registers do not come within predetermined amplitude limits, while the recording and addition continue, the additions will be simply zeros, which do not change the summed value in the registers.

BRIEF DESCRIPTION OF THE DRAWINGS

A better understanding of the principles and many details of the invention will be obvious from the following description taken together with the appended drawings, in which.

DETAILED DESCRIPTION OF THE DRAWINGS

Figure 1:
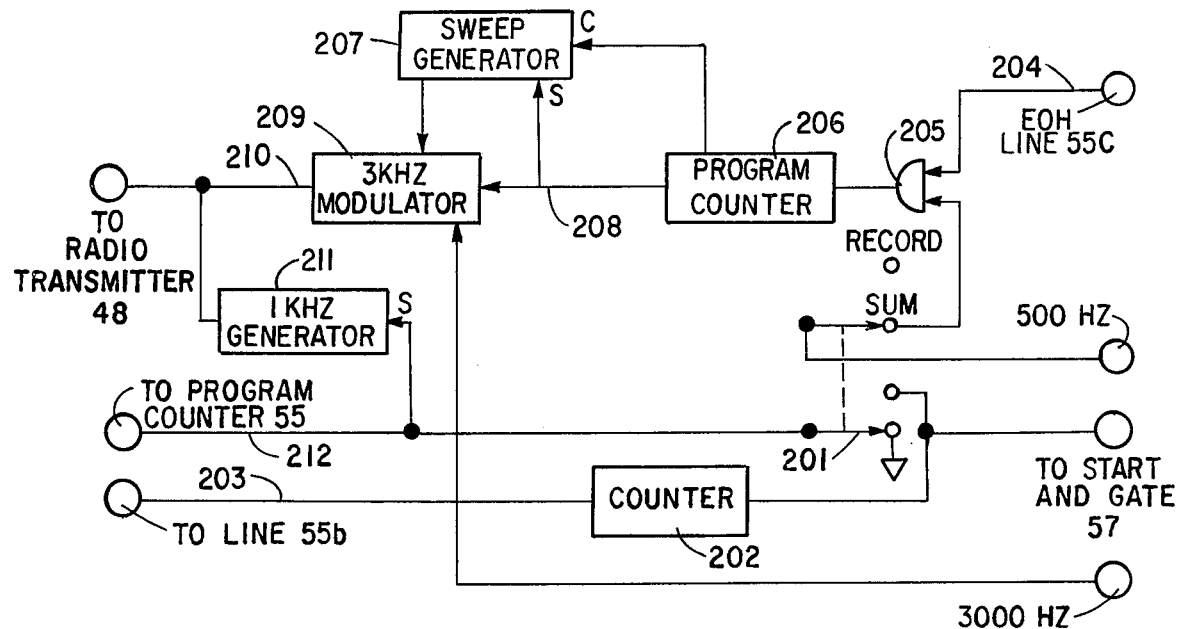
FIG. 1 is a block wiring diagram of modifications of the control unit shown in U.S. Pat. No. 3,806,864 to accomplish the control functions in this invention.

In order to shorten the description of the preferred embodiment, reference will be made to the description of the invention set forth in U.S. Pat. No. 3,806,864. It is to be assumed that the apparatus employed herein is that set forth in that patent, except as the differences are shown and described in the figures and this description. For example, FIG. 2 of the patent shows a control station which is employed to selectively activate a plurality but in general not all of the seismic group recorders set out on appropriate seismic spreads. It will be found from this description that nearly all of the control apparatus shown in FIG. 2 may be employed in the control apparatus of this invention. Accordingly, in what follows, a primary distinction between the two will be found in that the numbering system employed on the various units in the various drawings will start with "200". It is to be recalled that, in the description of the patent, it was shown that a radio transmitter 48 was modulated in order to activate those group recorders which were to be employed for a particular recording, at which time, the tape recorder motor was started up and the various apparatus employed at each activated seismometer group recorder caused to function. In the current arrangement, the transmitter is modified so that the appropriately modified seismometer group recorders are activated, but the tape recorder is not actuated initially. Referring now to FIG. 1, in advance of operations the double-pole, double-throw switch 201 is placed in its SUM position. Accordingly, the program counter 55 (in the patent) has its actuating input grounded at this point and is accordingly disabled. A line leads from the start AND gate 57 to a counter 202. This provides for a 10-millisecond delay before producing an actuating signal on line 203 which connects to line 55b of its control shown in FIG. 2 of the patent. Thereafter, the control apparatus associated with transmitter 48 operates functionally as set out in the patent to call out the serial codes of the seisomemter group recorders which are to be actuated. The signal on the EOH (end of header) line 55C of the patent is also connected to the terminal 204 which in turn is connected to AND gate 205 along with the 500-Hertz clock signal and that on the sum switch 210. When all of these signals are true, a 500-Hertz pulse train is fed to program counter 206. The program counter clocks the incoming 500-Hertz signal and gates it to the sweep generator 207 for a presettable time equivalent to the length of sweep desired, plus a listening period of normally 5 seconds for a total of 20.48 seconds. Concurrently with the start of sweep, the sweep generator 207 is enabled by line 208 from the program counter. In addition, the 3-kilohertz modulator 209 is enabled. Thus, the sweep signal is generated synchronously with the system 500-Hertz clock for a definite time period, as set by the program counter 206, and is supplied as a modulated 3-kilohertz signal to the radio transmitter on line 210.

At the end of the desired number of sweeps, the switch 201 is set to record. This disables the program counter 206 so no additional sweeps can be generated and simultaneously enables the 1-kilocycle tone oscillator 211 that furnishes a signal to the radio transmitter for a time period equivalent to the length of the CCD storage registers in the seismic group recorder (SGR) units. By this means, the previously summed data in the SGR's are recorded. The line 212 from the selector switch 201 also provides for enabling the program sequence as previously described. This provides for dumping the header storage registers in the SGR units, recording this header along with the summed CCD registers, furnishing the EOR (end of record) signal for stopping the tape transport, and returning the SGR units to a standby basis for the next address.

The scan generator 207 is well known in this art. It generates a frequency-modulated electric signal which, when transmitted to the shakers in the truck-mounted units, produces a substantially equivalent seismic signal at the source for use in the Vibroseis system.

Figure 2:
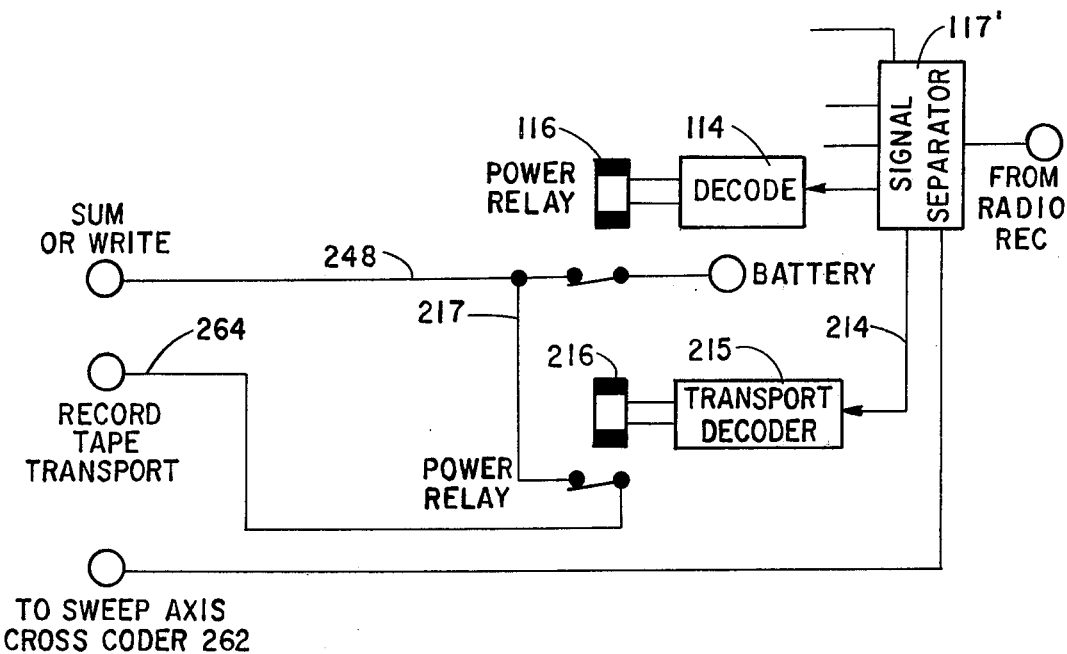
FIG. 2 is a block wiring diagram of modifications in the power train of the individual seismic group recorder as shown in FIG. 4 of that patent.

Refer now to FIG. 2 of this disclosure. The signal separator 117' is so designated because in part it is identical to signal separator 117 of the patent, but it has additional circuits within it which demodulate the 3-kilohertz sweep modulation for the coder 262 of FIG. 3 and filter out the 1-kilohertz signal from the radio receiver 110 of the SGR. This 1-kilohertz detector output appears on line 214, where it is used to actuate the transport decoder 215, which, in turn, closes the second power relay 216. This is normally open single-pole relay which is fed with battery voltage through the contact of power relay 116 by line 217 and feeds line 264 to the tape recorder. It is noted that the tape transport is not connected as in the patent to the output terminal of power relay 116. Only the CCD units and tape write registers are so connected to this line, labeled "248". The tape transport itself is connected through the terminals of the power relay 216, so that it is actuated when a 1-kilocycle signal is demodulated from the radio receiver. Referring briefly back to FIG. 1, it is therefore apparent that only when a 1-kilohertz signal is sent to the modulator of the radio transmitter 48, the tape transports of all of the actuated group recorders are turned on.

Figure 3:
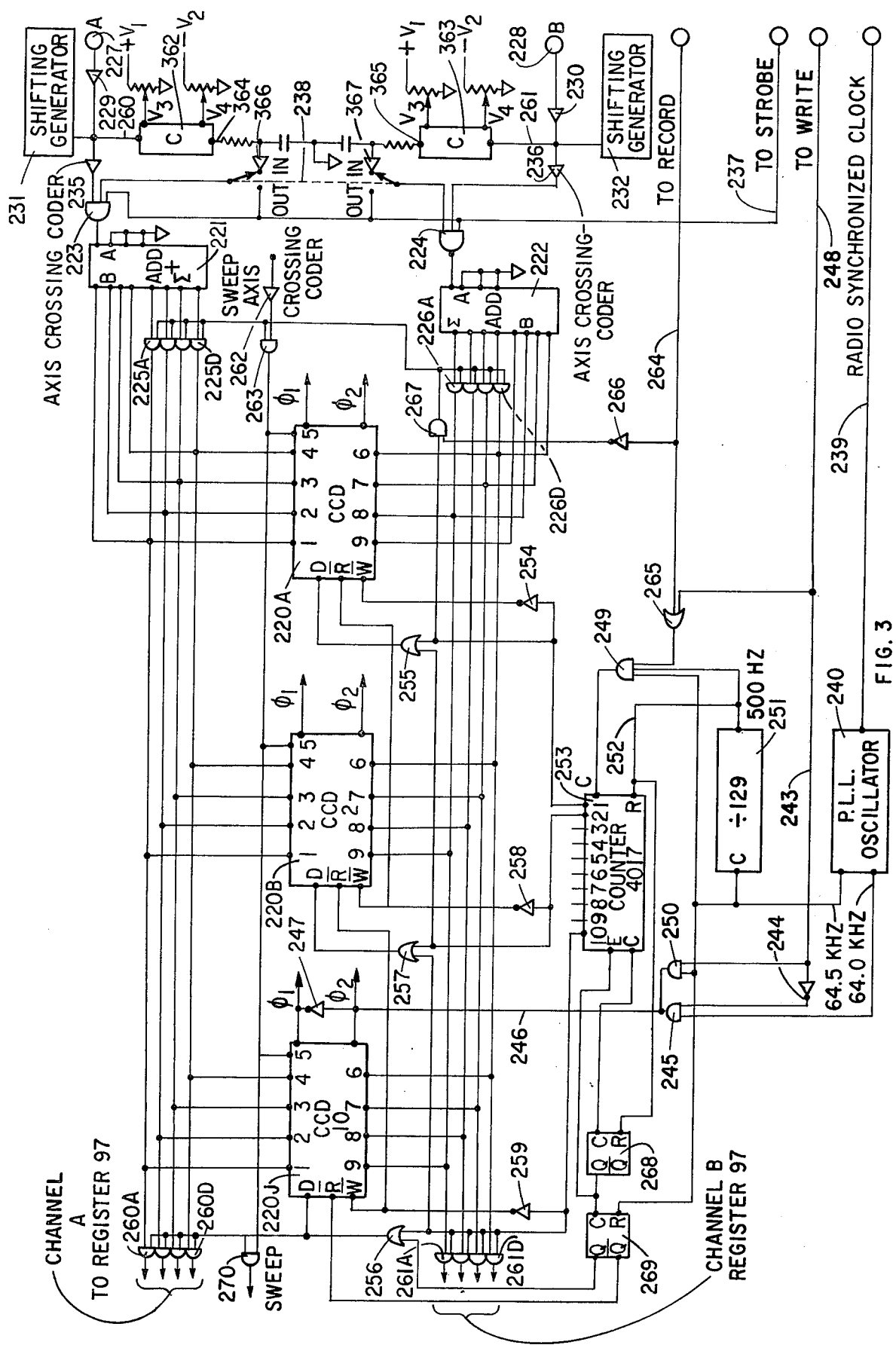
FIG. 3 shows a block diagram form the schematic wiring diagram by which two seismometer groups are individually summed with response of the same group or an earlier application of the seismic source, so that ultimately the summed record of n sweeps can be tape-recorded on the two channels of the tape recorder in the seismic group recorder.

The heart of this data-acquisition transmission and compositing system is found in FIG. 3. It is particularly notable for employing charge-coupled, automtically replenished serial memories, usually referred to as charge-coupled devices, CCD. These are devices that manipulate information in discrete charge packets. These packets are collectively transferred within a semiconductor storage element so that they travel unidirectionally, bit by bit. While there is no limitation to the use of a particular element, those which serve particularly well in this particular installation are the Fairchild CCD 450. This dynamic memory or shift register consists of 9216 bits, organized 1024 words by 9 bits. The integral shift registers are shifted in parallel to provide simultaneous storage and retrieval of 9-bit words in a word-serial format. The nine registers are serviced by common two-phase transfer clock signals. For a technical data sheet, see the brochure by Fairchild Camera & Instrument Corporation, dated June 1975, under the name CCD 450/450A. Ten of these, $220_A$ to $220_J$, are shown in FIG. 3, in cascade relationship so that information going into the first of these recirculation registers ultimately appears in the last of the set, and in serial order.

The other units which with these provide the large-capacity, low-power requirement memory are the two adders 221 and 222. These are monolithic, silicon, digital integrated circuits, of types CD 4008AD, AE, or AK. Each of these consists of four full-adder stages with fast look-ahead carry provisions from stage to stage. Circuitry is included to provide a fast parallel carry-out bit to permit high-speed operation in arithmetic sections. Technical data on this are found in RCA Solid State Databook Series SSD-203. As employed in this circuit, the output from the last recirculating memory shift register $220_J$ goes to the B terminals of the first adder 221, where the signal bit from the B channel is added to that incoming from the AND gate 223. Thus, if there is a bit on the line from AND gate 223, it is digitally added to that being recirculated and the result, passing through the AND gates $225_A$ and $225_D$ (or on the other side, $226_A$ and $226_D$), that is, the sum of the two signals, is impressed on the corresponding memory cell in the first memory $220_A$.

Within each circulating memory, there is provision for refreshed or replenished turnaround at the end of each line, so that the data, once stored, are always available without attenuation is precisely the digital form (a logical 1 or a logical 0), as originally presented. From the above, it is seen that since the bit length in each serial storage is 1024 bits, at a 2-millisecond sampling interval, slightly over 2 seconds of storage (actually, 2.048 seconds) is provided in each chip. The total overall memory, therefore, provides for 20.48 seconds of storage in each data line. Each chip has a common set of two clock lines (which move or circulate data), a data enable line, a RE line, and a WE line, permitting the devices to operate any of four modes, READ, WRITE, READ/MODIFY/WRITE, and RECIRCULATE.

In this summer, the READ and WRITE mode is used for inserting and withdrawing the data to and from the circulating registers. The READ and WRITE data lines to each CCD register is a single lead, and switching to READ or to WRITE is performed by the CCD. The accomplish this switching, the ten CCD registers $220_A$ to $220_J$ are sequentially gated with a high input to the data (D) line by a counter 253. This counter operates at a 64.5-kilohertz rate from a pulse burst initiated each 2-millisecond interval from AND gate 249. The necessary commands given at each (D) enable time are derived from the outputs of counter 253. For example, on the first count or output from terminal 1 of 253, the level is inverted by buffer 254 that, in turn, lowers the level at the ($\overline{W}$) terminal of $220_A$. This low level, in combination with a high level on the (D) terminal from OR gate 255, sets the condition for WRITE at register $220_A$ and inputs 1 through 9 of register $220_A$ are stored. At this time, the level on the $\overline{R}$ terminal of $220_A$ is high since there is no signal from count 2 of counter 253. These are the proper commands at unit $220_A$ for writing the signal that is on the data bus into the registers. It represents the initial condition for a sum. Previously, the carry output of 253 had set the Q output of flip-flop 268 high. In turn, the $\overline{Q}$ output of flip-flop 269 was low, allowing the $\overline{R}$ of unit $220_J$ to be low, and the (D) input high from the Q output of 269 via OR gate 256. This is the necessary condition for reading the last cell in register $220_J$. This signal, as read, is then on the data bus line and is present at the B inputs of adders 221 and 222. This B input is added to the A input and is ready for gating to the data bus line for the first count of unit 253. This gating is accomplished by enabling gates 225 A–D, gate 263, and gates 226 A–D.

On the next cycle of the 64.5-kilohertz signal to counter 253, the number 2 output is enabled and output 1 returns to a low. The high output of number 2 enables register $220_B$ in a sequence similar to that described above for unit $220_A$. The counter output is sent via OR gate 255 to the enable line of 220A connected to the (D) input of register $220_A$. This enables the READ mode of unit $220_A$ and data supplied to the data bus for unit $220_B$. In turn, this unit $220_B$ is enabled to write by the low status of inverter 258 from the high level of its input at count 2 time. Thus, the READ pulse of $220_A$ is transferred to the WRITE of unit $220_B$ and stored in the second cell of unit $220_B$. In a similar manner, each CCD sequentially transfers the information in its last cell to the first cell position of each of the next CCD.

The tenth command signal from 253 enables the (D) input of unit $220_J$ via OR gate 256. The tenth command also feeds inverter 259 to produce a low on the $\overline{W}$ terminal of register $220_J$. This is the condition for writing data into the last CCD. This command is followed by a read command at the next cell time, as generated by counter 253 (C) output. This (C) or carry output clocks flip-flop 268. The flip-flop inhibits counter 253 by raising its clock enable line and simultaneously clocks flip-flop 269, which, in turn, lowers the level to the ($\overline{R}$) input to unit 220J. The OR gate 256 allows the command to raise the level on the (D) input which completes the commands for reading of unit $220_J$. Flip-flop 269 is reset on the next cell count to permit circulation of the CCD's to continue. Counter 268 is not reset until the next 2-millisecond output of divider 251.

Gates 260 A–D, 270, and 261 A–D are enabled by the same (D) command furnished unit $220_J$. This allows the data from register $220_J$ to transfer from the data bus to the output register 97 for tape recording.

During the above sequence, the sweep signal has been received, demodulated, is axis-crossing coded, and fed to the AND gate 263. This gate is also fed from counter 253 output No. 1. This permits the sweep signal to be gated via the data bus to CCD elements $220_A$ to $220_J$, and subsequently recorded on the tape recorder.

The command to sum or write is enabled by line 248. The command to record is enabled by line 264. A high on this line enables gate 249 via AND gate 265. This sequentially unloads the CCD's $220_A$ to $220_J$ to the tape recorder. To insure that no spurious signals are present on the data bus during this recording, an inverter buffer 266 inhibits AND gate 267 and, in turn, inhibits AND gates $225_A$ to $225_D$, 263, and $226_A$ to $226_D$. Thus, the data bus is clear of any new signals during a recording. This also clears all CCD cells for recording of the next sum.

It has already been mentioned that a particularly advantageous way of handling the data generated by the seismometer group is to use sign-bit recording. FIG. 3 will make this more clear. A group of seismometers which may be anything from a minimum of two to a very large number of seismometers or geophones are connected together and figuratively located in a local region of the earth, preferably on the surface. These are collectively referred to by symbol 227 for one group, and 228 for the adjacent or neighboring group. These are connected together to the input amplifier 229 or 230. In sign-bit recording, another signal is present which is referred to as a shifting signal. This may accompany the signal or be separately generated in generators 231 and 232. Examples of such generators are noise generators, sinusoidal generators, sawtooth wave generators, etc. These produce signals which, when added to an analog signal, cause a shift of the axial-crossing times of the sum of the analog signal and the output of the generator. Preferably, the peak amplitude of the noise signal (whether from seismometers or from the shifting function generator) is greater than that of any useful seismic signal. Under these circumstances, it can be shown that the time of axis crossing reflects the effect of the useful signal in the random noise pattern, which is emphasized on repetitive, summed recordings.

Basically, the logic back of sign-bit recording is that if a randomly varing noise signal has added to it a specific signal (in this case, the response of geophones or seismometers in a group to a frequency-modulated impressed seismic signal at the source) capable of repetition, the periodically sampled sum contains in the output a representation of the geophone response. This can be found in the instantaneous amplitude of the added signals at the instants of sampling, or in the sign of direction of crossing the zero signal axis. A single record of the sign at the instants of sampling will be more representative of the noise than of the specific signal. Two superimposed records of the sign bits will be somewhat more representative of the specific signal, since, at greatest amplitudes of the specific signal, the output sign will be the same for the two records, and for somewhat lower level amplitudes of the specific signal, the probability of the sign bit representing the specific signal has been increased. For three or more superimposed records, the tendency of the output to show in amplitude and frequency content the specific signal gradually increases. Accordingly, this very simple arrangement for repetitively summing the sign bit of periodically sampled added noise and signal does ultimately produce a very good representation of the group response to the impressed seismic signal.

From theory, one can say that if the noise present is essentially Gaussian, one obtains the desired linear output of the summed reproducible record if the ratio of maximum instantaneous signal input amplitude due to the impressed seismic signal at the source to the standard noise deviation (i.e., the noise amplitude does not exceed at a probability of 0.68) is not more than about 0.7 to 0.8.

Axis-crossing coders 235 and 236 are employed, which in simplest terms, can be regarded as circuits which take the derivative of the input, and are therefore capable of putting out a pulse at the interval when amplitude zero axis is crossed, and with the sign (positive or negative) determined by direction of axis crossing. The output of the axis-crossing coder is sampled at essentially constant frequency. This output is one input into the triple input AND gates 223 and 224, respectively. A second signal into these AND gates comes from the 500-cycle strobe line 237, while a third input comes from the blade of a double-pole double-throw switch 238, in one position of which the third terminal is simply paralleled to the 237 line, and in the other direction is connected to the output of a quality circuit to be described subsequently. Accordingly, the AND gates 223 and 224 act as sampling devices, putting out either a logical one or zero, depending upon direction and occurrence of an axis crossing at the time of the sampling interval. The output of these two AND gates, as mentioned above, are put into the first terminal on the A side of the adding circuits 221 and 222. The other A terminals are grounded.

If one assumes that there is no output into the B terminals of the adders 221 and 222 at the instant a signal appears on the output of AND gate 223 or 224 (and hence on the A input to the adders 221 or 222) this signal will appear essentially instantaneously at the adder output terminal, and will be passed by the AND gates 225 A to D to the recirculating, dynamic shift register $220_A$.

The manufacturer data on the CCD 450 recirculating dynamic register states that it must be clocked at a minimum rate of 50 kilohertz. For a data rate of 2milliseconds, or 500-Hertz signals, the circulation rate for a single register is the number of memory cells in the serial array (128) divided by 2 milliseconds or 64 kilohertz. This is in the internal refresh turnaround clock frequency for the cells at each 128-cell line. Accordingly, the time signals form the radio-transmitted clock (i.e., from the control), which puts out a constant 500-Hertz signal on line 118a, is applied through line 239 to a phase-lock loop oscillator 240. This is a very common unit and can be designed to put out synchronously any desired frequency. In this particular case, there are two synchronized outputs from the oscillator, at frequencies of 64.0 kilohertz and 64.5 kilohertz. The reason for the particular choice of these frequencies is that at a frequency of 64.0 kilohertz applied as a two-phase signal to the circulation terminals $\phi_1$ and $\phi_2$, the input to cell 1 of unit $220_A$ arrives at the output of the first loop exactly 2 milliseconds later on. On the other hand, at a frequency of 64.5 kilohertz, there is a circulation of 129 cells in the same period of time, a circulation which will hereafter be termed "precession."

The control for the phase-lock loop oscillator output comes from line 248 that is connected to the WRITE terminal of the flip-flop unit 121.

This signal passes through a phase-reversing unit buffer 244 into one terminal of the Circulate AND gate 245. The other terminal of this AND gate is connected to the 64.0-kilohertz output of the phase-lock loop oscillator 240. Since the AND gate terminals are true wherever there is no write signal on line 248, a 64-kilohertz signal is applied to line 246 and from here in parallel to all of the clock terminals $\phi_2$. A second phase-reversing unit amplifier 247 applies the second phase in parallel to all of the clock terminals $\phi_1$. As above mentioned, this causes all of the dynamic shift registers $220_A-220_J$ to internally circulate at a 2-millisecond rate, that is, a signal recirculates in each line within one of these chips at a synchronous rate of 2 milliseconds per circulation.

Now, let us consider the circuit which causes the dynamic shift registers $220_A-220_J$ initially to store the data in their memory cells and subsequently by precession cause this material to pass from one memory to the next. This involves a signal on the Write terminal 248. This places a signal through OR gate 265 to one of the three input terminals of AND gate 249, and simultaneously to a terminal of the Sum AND gate 250. Since the other input terminal to the AND gate 250 comes from the 64.5-kilohertz oscillator terminal, AND gate 250 now passes the 64.5-kilohertz signal to line 246, and the AND gate 245 has been cut off. The clock terminals of the dynamic shift registers $220_A-220_J$ are now being supplied with two-phase voltage at a slightly faster rate. This same 64.5-kilohertz signal is also being applied to a second terminal of AND gate 249, while this signal divided by 129 by the divider 251 is supplied to the third terminal of this AND gate 249. All of these terminals are ture, and therefore a true signal passes through the AND gate 249. Simultaneously, a signal from the 500-Hertz output from the divider 129 (64.5 kilohertz/129=500) through line 252 initiates counter 253, and causes the signal on the output of AND gate 249 to be sequentially impressed on the $\overline{R}$, $\overline{W}$, and data terminals of units $220_A$ to $220_J$. As a result, each 2 milliseconds the dynamic shift registers in the chain sequentially read out one signal and read in an additional signal at opposite ends of the 128-cell group. It is apparent from what has been stated above that the 128-cell lines which are refreshed by turnaround (i.e., circulating) cause data to enter one cell since the enable pulses for READ and WRITE are not longer than one cell time, that is, $1 \div 64.5 \times 10^{-3}$ or 15.504 microseconds. Since this is the period of the pulse on the output terminals of counter 253, the result is accomplished.

One could summarize this action by stating that as long as the 64-kilohertz rate is maintained, there is no action at the output of counter 253 and, accordingly, the data are simply circulated in the respective dynamic shift registers $220_A$–$220_J$ at the 64-kilohertz rate, and no additional material enters the memory banks. When the WRITE terminal (248) is energized, the counter 253 commences gating in and out additional bits of information and the storage of the data is being accomplished.

It was noted earlier that the output from the last recirculating dynamic shift register in the chain ($220_J$) is connected by the four signal bus wires to the input terminals B of adder 221. The same is true for the other channel. Accordingly, when a data bit is first encountered on the output line from the last register, it is put into the adder 221 through this bus line, so that if there is a new signal coming through AND gate 223 to the A terminal at this point, the addition of the two will be recorded in the first memory cell of the recirculating dynamic register $220_A$. Put another way, the first time the sweep is transmitted by radio transmitter 48 to the shaker trucks and to the activated seismic group recorders, by the action already outlined there will be a zero pulse on each of the lines to terminals B of adders 221 and 222, and a signal of 20.48 seconds, which is the response of the seismometer groups by the sign-bit recording process, will be imposed on the dynamic shift register cells in serial order. As soon as the second sweep is to start, by the impulse given to the WRITE terminal 248, the data in each individual chain of data cells are in turn returned through the feedback line to these terminals B, where these data are appropriately added to any signal coming from the AND gates 223 and 224, and reentered into the dynamic shift memories. (In passing, it might well be noted that since the data in each of the memories, such as unit $220_J$, cycles at a 2-millisecond rate, the memory is not only automatically synchronized for each succeeding sweep addition, but is ready for the succeeding sweep in a lapsed time of 2 milliseconds).

While it is not a necessary feature of my invention, it is frequently desirable in apparatus of this general data-aquisition type to arrange automatically to discard data which are not of a desired quality. In terms of the input by the seismometer group, this really means that the output amplitude of the signals from axis-crossing coder 235 or 236 do not lie within specified limits.

In order to take care of this, it is simply necessary to monitor the output of each of these units. Thus, for example, by line 260 or line 261, from the output of units 229 and 230, respectively, this signal is imposed on a comparator unit 362 or 363. As is well known, such comparator circuits automatically compare the output of the desired signal (on lines 260 or 261) with that of two adjustable voltages $V_3$ or $V_4$ obtained from potentiometers attached to voltages $+V_1$ and $-V_2$, respectively. If the resultant voltage due to the comparison (which appears as a fluctuating DC potential on lines 364 and 365, respectively) is on the average sufficiently great, the data quality is clearly out of line and a change should be made. In all events, the data should be discarded. This can be automatically accomplished by putting the output on terminals 364 and 365 onto an R-C integrating circuit, as shown, so that the inadequate quality is represented by a specified voltage at the junction between R and C. This voltage is reversed by the unit amplifier 366 or 367, so that absence of a signal on the output of these reversing amplifiers represents bad quality data. If switch 238 is in the position shown in FIG. 3, an absence of voltage on one of the three feeds to the AND gates 223 and 224 automatically causes no signal output to be obtained from these AND gates. Thus the quality control detector, using this level control system, inhibits additional input to the summer if the input signal is higher than usual, corresponding to road or traffic noise, or lower than normal noise, corresponding to no sweep. This reduces and in effect minimizes the summation of inputs which do not contain useful seismic signals. The time delay which is induced by the R-C circuit insures that the comparator signal represents a significant sample of data to give a reliable command. For this reason, I prefer to start with a time constant R-C of the order of 0.5 seconds, although experience may indicate in a particular survey area that a different value should be employed. The time delay introduced by the R-C circuit also eliminates false triggering due to very strong reflections or first breaks, as well as the arrival of low-level signals received prior to the first seismic information.

As earlier mentioned, this quality control can be switched out of the individual recorder by manual operation at the group recorder of switch 238 to the opposite position from that shown in FIG. 3.

When the switch 201 is placed in the Record position, as earlier mentioned, a 1-kilocycle signal modulates the radio, the tape transport is energized, and accordingly, as the 64.5-kilohertz signal recirculates the chain of dynamic register memories, the first four terminals of unit $220_J$ will unload the summed signals through the storage register 97 onto the tape, the bottom four units will similarly unload the summed signals on channel B, and the center channel, which has automatically recorded each time the sweep of the Vibroseis pilot signal discharges this into the center channel of the tape.

When using dynamic memories which have a breadth of nine channels, using four of these for channel A and another four for channel B, there is for each channel a dynamic range of $2^4$ or a maximum range of 16 to 1 in the addition of signals due to the various sweeps. Thus, I prefer to add a total of not more than about 16 sweeps when employing sign-bit recording. Of course, if desired, the four memory chains devoted to channel B could be devoted to four additional channels in channel A, changing the adders 221 and 222 to 8-channel type instead of 4-channel type. This would increase the power consumption by the memory circuits both in circulate and precession mode, but not to an excessive amount.

The use of the particular memory shift system shown helps the power problem in that it only requires a maximum of 250 milliwatts per 1024 by 9-bit deep memory, i.e., the total memory register of slightly over 20 seconds requires only 2.5 watts. During standby (that is, when the memory is not being used in the READ/WRITE mode) the register internally circulates at a power requirement of approximately 50 milliwatts. The average power consumption of the 10-stage register shown is approximately 650 milliwatts. Since the recorder motor uses 3 watts, it is apparent that the saving in not using the recorder motor each sweep is of the order of 5 times. The seismic group recorder power requirement is therefore approximately 2 watts during circulation or compositing, and 5 watts during actual tape recording. Thus, a 3-ampere hour battery (which is a convenient size of storage unit for this particular application) allows of the order of 12 hours of use per full charge. This is a relatively large saving of power. An alternative to this system, for example, using MOSLSI units would require approximately 100 microwatts power per bit. Thus, a 50,000-bit register would require 5 watts of power, or approximately the same power as needed for the tape recorder.

Since this specification is directed to those skilled in the data-acquisition art and particular data acquisition in geophysical surveying, it does not appear to be necessary to describe in additional detail how one would adapt the circulating memory made up of this chain connection of dynamic shift registers of CCD chips for other applications. Certainly this is true isofar as the geophysical surveying technique is concerned. Accordingly, no attempt is being made to describe the adaptation of this arrangement to other types of repetitive sources in which second, third, and subsequent responses of the seismometer group are added to the responses of the earlier signals until the operator is prepared to make a reproducible tape record of the material then stored in the dynamic memory. Accordingly, it is to be understood by those reading this that the invention is not limited by the preferred embodiment described, but is best set out in the scope of the appended claims.

I claim:

1. In a portable recorder containing means to receive and amplify an electric signal, means to sample the amplified signal periodically at a base frequency $f_1$, and means for recording reproducibly on a medium a quantity directly proportional to the sampled amplitude of said amplified signal, the improvement comprising
   1. a plurality of charge-coupled shift registers connected in cascade, each such register being capable of storing in an identical plurality of channels of N successive adjoining memory cells charges equivalent to a logical one or a logical zero, and of replenishing automatically such charge values as said values move through said cells, said registers further being capable of moving said charge values through said plurality of memory cells on application of a multiphase electric voltage of a frequency lying within a predetermined range, said registers further being capable of discharging said charge value in the last of said memory cells into said means for recording reproducibly, the write terminals of each of said shift registers being connected to the read terminals of the next preceding of said shift registers,
   2. a bank of AND gates for synchronously inserting new data to a plurality of conductors as well as to a second bank of AND gates for synchronously transferring output data from said plurality of conductor lines to said means for recording,
   3. said plurality of conductors, insulated from each other, forming bi-directional data transfer lines, each of said plurality of conductors connecting in parallel only data lines of said charged coupled shift registers, an adder, and said AND gates used with each conductor,
   4. said adder circuit containing two sets of input terminals and a set of output terminals electrically equal to the digital sum of the electrical input signals on both said sets of inputs, one only of said sets of inputs being connected to the conductors forming said transfer bus, and the other of said sets being connected to the output of said sampling means of said portable recorder,
   5. stable oscillator means for producing an actuating signal at a predetermined base frequency $f_1$, connected to and actuating said sampling means,
   6. a synchronized second oscillator connected to said stable oscillator means for generating two output signals, one at a base frequency $f_2$ where $f_2$ is $f_1$ times N, and the other at a base frequency $f_3$ where $f_3$ is $f_1$ times (N+1),
   7. means alternatively connected to said two output signals of frequency $f_2$ and $f_3$ for producing a multiphase signal connected in parallel to the appropriate terminals of all said shift registers for moving charge values through said memory cells thereof,
   8. a frequency divider synchronized by connection on the input to the signal of frequency $f_3$ for producing an output of base frequency $f_1$ by division by (N+1),
   9. a program counter containing a number of separate, equally serially spaced outputs corresponding in number to the number of said shift registers, each of said outputs in turn being connected to send an operative pulse to the write terminal of the corresponding one of said shift registers in accordance with its position in the cascade connection, the reset input of said counter being connected to the output of said frequency divider,
   10. a plurality of OR gates equal in number to the number of said shift registers, each containing two inputs and one output, one each of said inputs being connected in turn to one of the separate outputs of said program counter, the second of each of said inputs being connected to the next succeeding of the separate outputs of said program counter, and said output being connected to the data terminal of the corresponding one of said shift registers, and
   11. an actuating circuit including separate means for producing a write and a record actuating electric signal, said means being connected to the two inputs of an OR gate, the output of which forms one input to a 3-input AND gate, the other two inputs being connected respectively to the output of said frequency divider and to the frequency $f_3$ output of said second oscillator, the output of said AND gate being connected to the clock terminal of said counter, said means of producing said write actuating signal being connected to one input of another OR gate, the other input to which is connected to the actuator of frequency $f_1$ of said sampling means, the output of said another OR gate being connected to alternative switching means interposed between the $f_2$ and $f_3$ outputs of said second oscillator and said means (6) for producing a multiphase signal whereby said last-mentioned means operates either at base frequency $f_2$ or $f_3$.
   whereby said shift registers precess at frequency $f_2$ until a write pulse is generated which causes said shift registers to sum any stored input synchronously with input from said adder circuit at frequency $f_3$, and whereby, on generation of a record pulse, the contents of said cascaded shift registers are serially dumped into said means for reproducibly recording to form a reproducible record of said sums.

2. Apparatus in accordance with claim 1 in which there is interposed between the last of said cascaded shift registers and the storage register forming part of the means for reproducibly recording and specifically between each conductor of said transfer bus and the appropriate input terminal of said storage register, an AND gate, the two inputs to each of which are respectively connected to said conductor of said bus and the last of said spaced outputs of said program counter, the output of each such AND gate being connected to the appropriate input terminal of said storage register.

3. Apparatus in accordance with claim 2 including a first flip-flop clocked by the $c$ or carry terminal of said program counter connected to inhibit said program counter, a second flip-flop clocked by said first flip-flop and connected to one input of a third OR gate, the other input to which is connected to the last of said spaced outputs of said program counter, and the output of which is connected to the data terminal of the last of said cascaded shift registers, said second flip-flop having a second output terminal in phase opposition to its first terminal connected to the read terminal of said last of said cascaded shift registers, said first flip-flop being reset by connection to the output of said divider and said second flip-flop being reset by connection to the $f_3$ output of said second oscillator.

4. Apparatus in accordance with claim 3 including means in said portable recorder for obtaining a receiver signal proportional to a pilot signal at a source location, means for impressing a signal directly related to said receiver signal on one channel of said cascaded shift registers and for dumping the output of said one channel serially into said storage register, by means of which when said means to receive are connected to an input, the reproducible record produced after summing a plurality of responses contains both said summed responses and a separate record of sums of said pilot signal.

* * * * *